US008229755B2

(12) United States Patent
Felice

(10) Patent No.: US 8,229,755 B2
(45) Date of Patent: Jul. 24, 2012

(54) SYSTEM AND METHOD OF NETWORKED WAGERING

(76) Inventor: David A. Felice, Wilmington, DE (US)

( * ) Notice: Subject to any disclaimer, the term of this patent is extended or adjusted under 35 U.S.C. 154(b) by 1120 days.

(21) Appl. No.: 12/150,620

(22) Filed: Apr. 30, 2008

(65) Prior Publication Data

US 2009/0275396 A1  Nov. 5, 2009

(51) Int. Cl.
*G06Q 10/00* (2006.01)
*G06Q 99/00* (2006.01)
(52) U.S. Cl. .......................................... 705/1.1; 705/317
(58) Field of Classification Search ................ None
See application file for complete search history.

(56) References Cited

U.S. PATENT DOCUMENTS

| | | | |
|---|---|---|---|
| 5,960,411 A | 9/1999 | Hartman | |
| 6,425,828 B2 | 7/2002 | Walker et al. | |
| 6,527,638 B1 | 3/2003 | Walker et al. | |
| 6,935,952 B2 | 8/2005 | Walker et al. | |
| 7,179,170 B2 | 2/2007 | Martinek | |
| 7,277,926 B1 | 10/2007 | Lee | |
| 7,303,473 B2 | 12/2007 | Rowe | |
| 2003/0017871 A1* | 1/2003 | Urie et al. ................ | 463/29 |
| 2003/0022719 A1* | 1/2003 | Donald et al. ............. | 463/42 |
| 2004/0034593 A1* | 2/2004 | Toneguzzo et al. ........ | 705/39 |
| 2007/0197247 A1* | 8/2007 | Inselberg ................. | 455/517 |
| 2007/0250392 A1* | 10/2007 | Paulsen et al. ............ | 705/19 |
| 2007/0250441 A1* | 10/2007 | Paulsen et al. ............ | 705/39 |
| 2008/0167060 A1* | 7/2008 | Moshir et al. ............. | 455/466 |

OTHER PUBLICATIONS

Internet Gambling—An Overview of the Issues—Report of General Accounting Office (GAO-03-89, Dec. 2002).
Title 6 Delaware Code Annotated Section 18-215.
Title 31 United States Code Annotated Section 5361.

\* cited by examiner

*Primary Examiner* — Jonathan Ouellette
(74) *Attorney, Agent, or Firm* — Ballard Spahr LLP

(57) ABSTRACT

A system and method to permit foreign or interstate wagering from remote locations where the wager is placed, accepted and settled all within a state, territory or other forum where wagering and other gaming is sanctioned. An organization situated in the forum location (the "forum host") establishes and maintains a business entity to bestow an intra-forum presence to the foreign or interstate player. Through the business entity, the forum host can account for the player's wagers, winnings and losses, while at the same time, allocating and/or collecting the appropriate federal, state and/or local taxes and fees on the member/player's account. The process is automated via a host computer system, which manages betting activities of a plurality of members/players, and enables one or more players at a remote location to participate in intrastate gaming for purposes of the local forum's laws, rules and regulations affecting the gaming industry.

9 Claims, 6 Drawing Sheets

Automated Player System

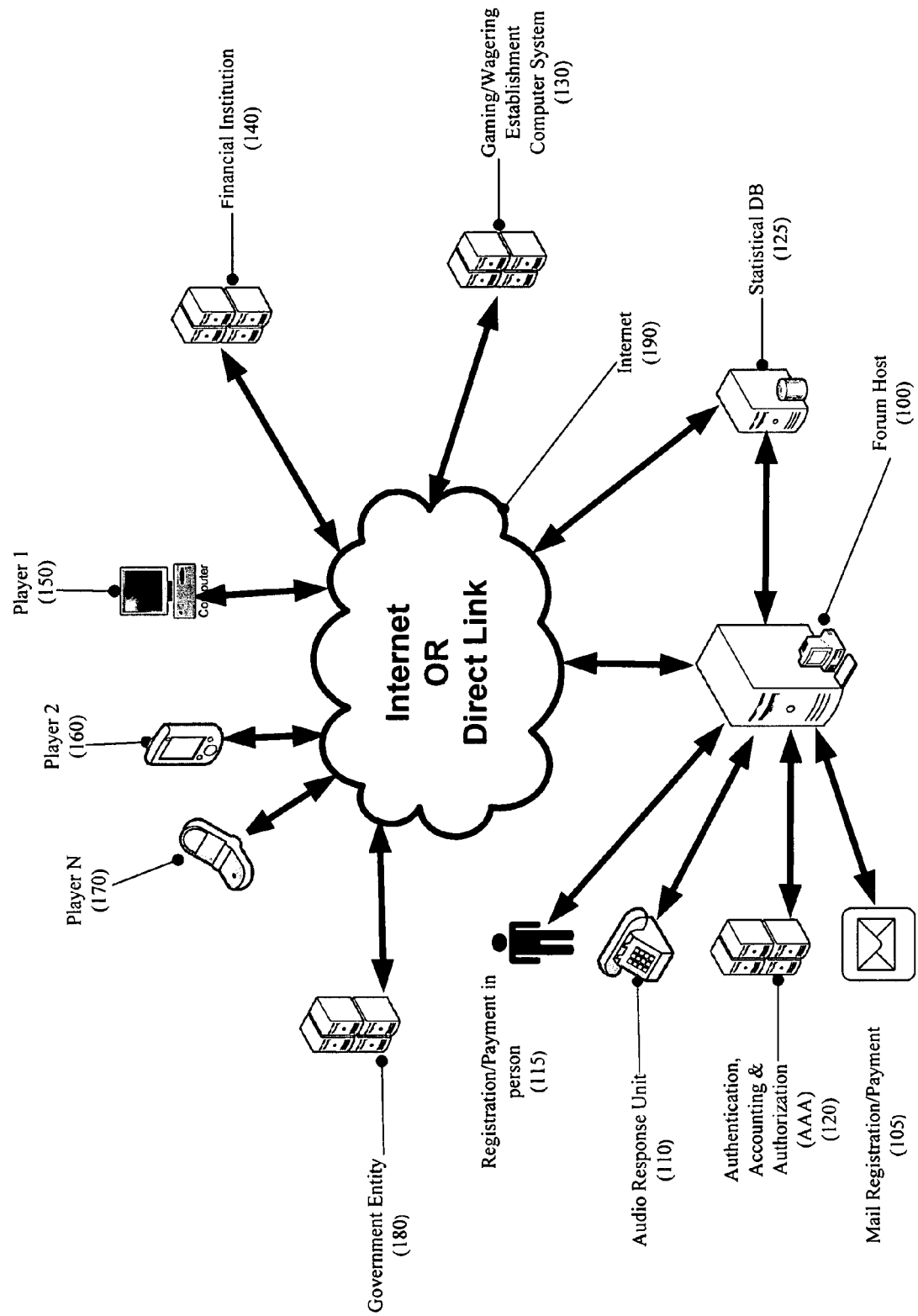
FIGURE 1. Automated Player System

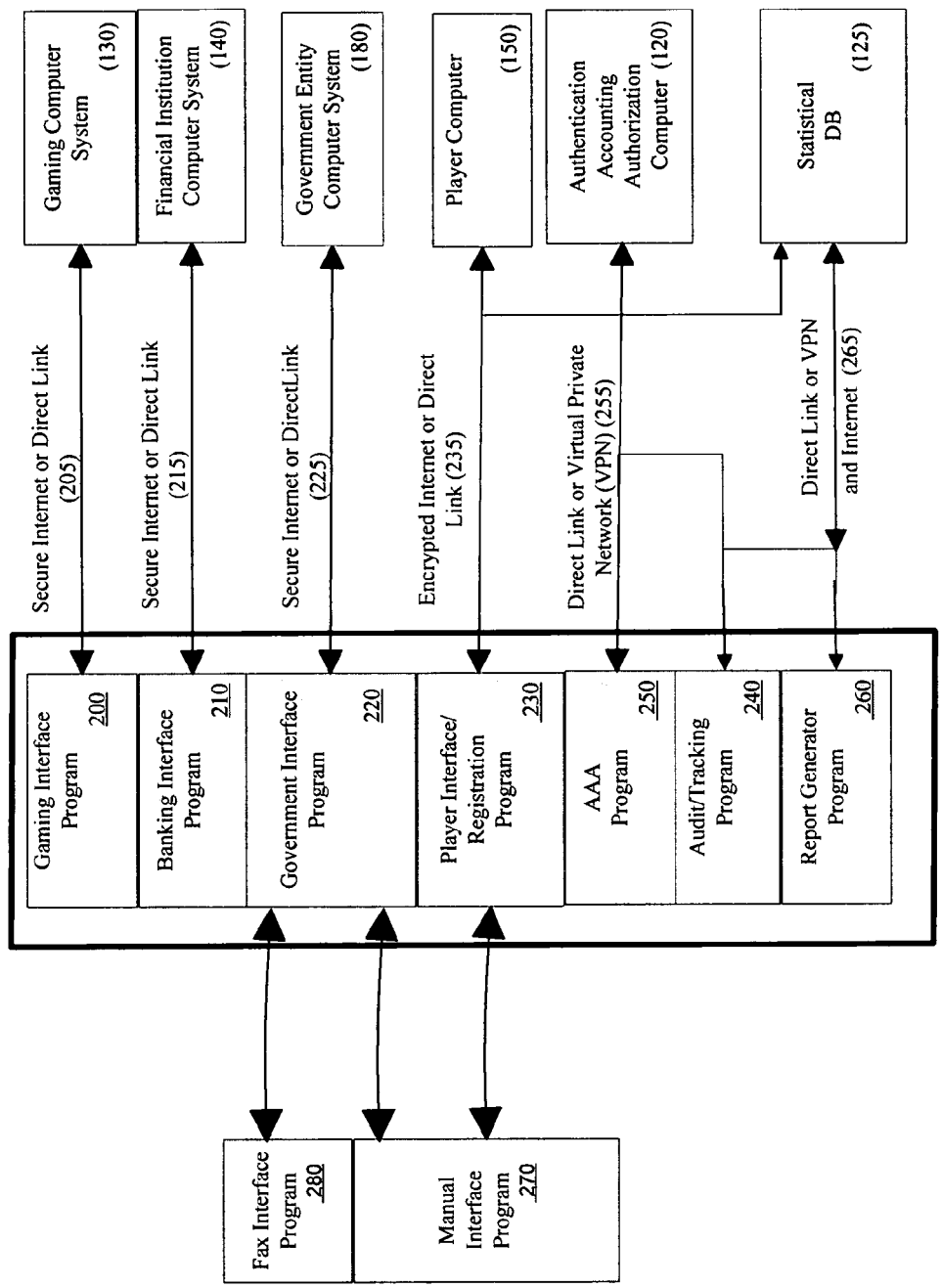
FIGURE 2. Host Computer Interface Block Diagram

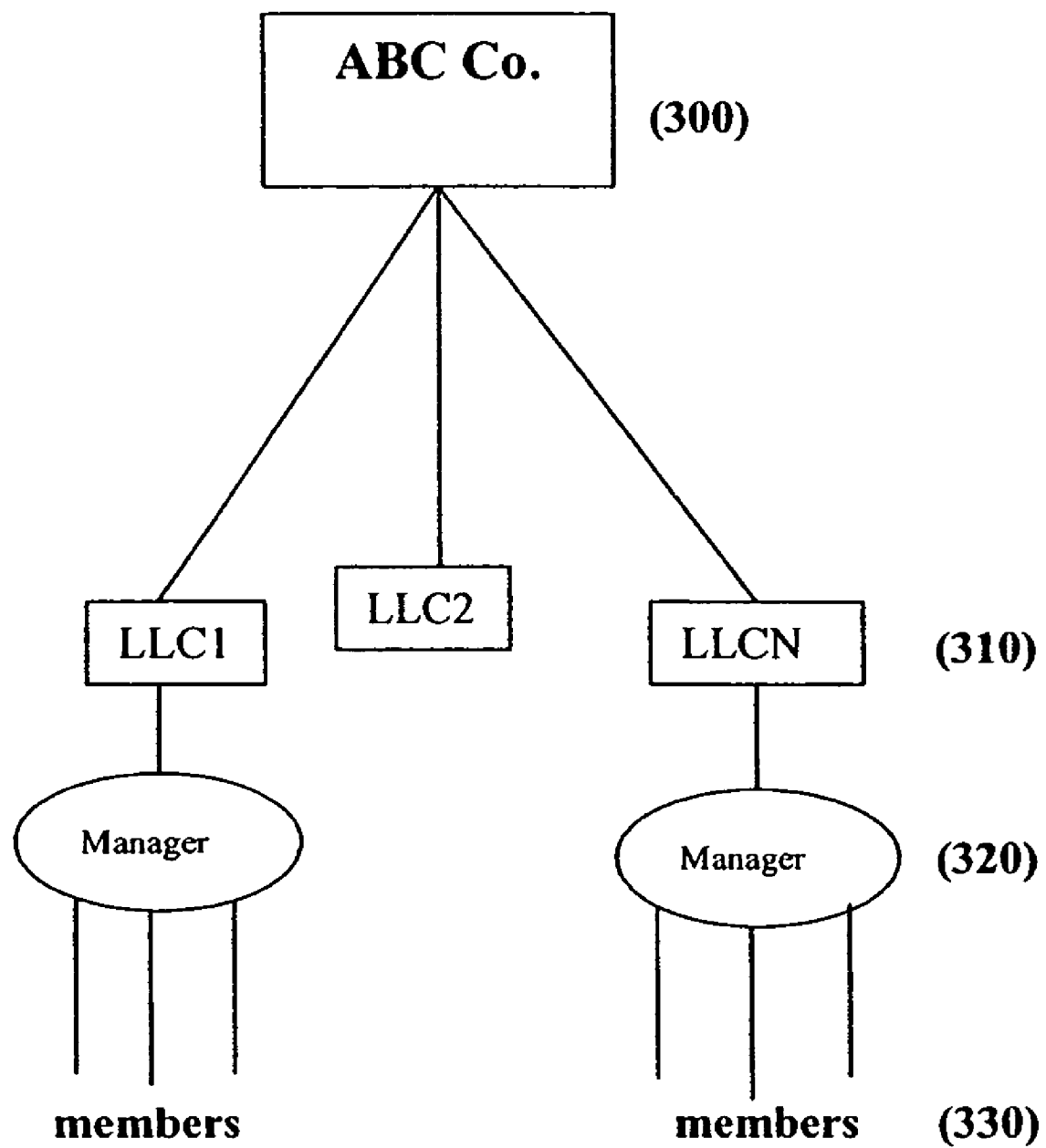
FIGURE 3. Series LLC Configuration

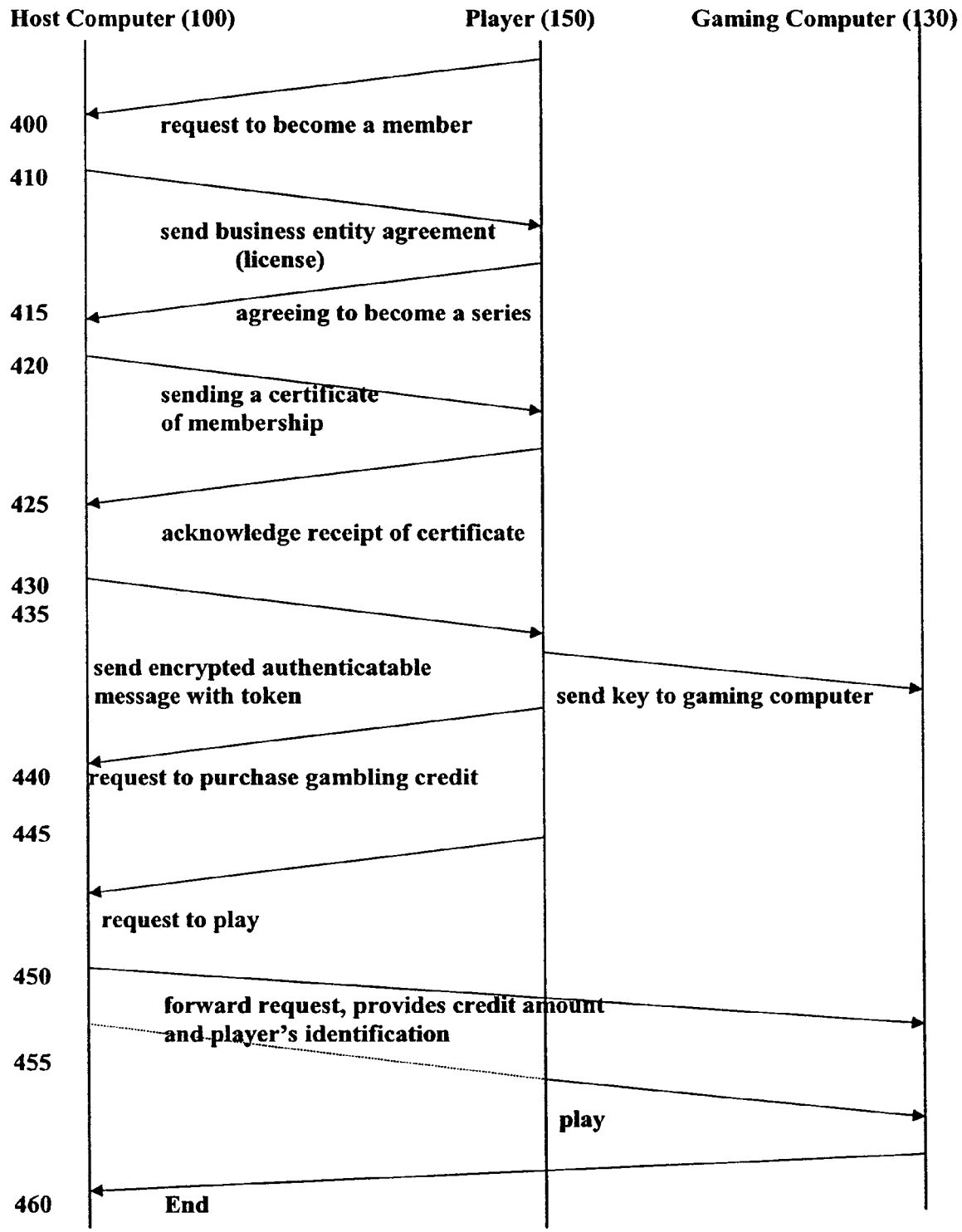
FIGURE 4. FLOW DIAGRAM BETWEEN HOST COMPUTER, PLAYER AND GAMING COMPUTER

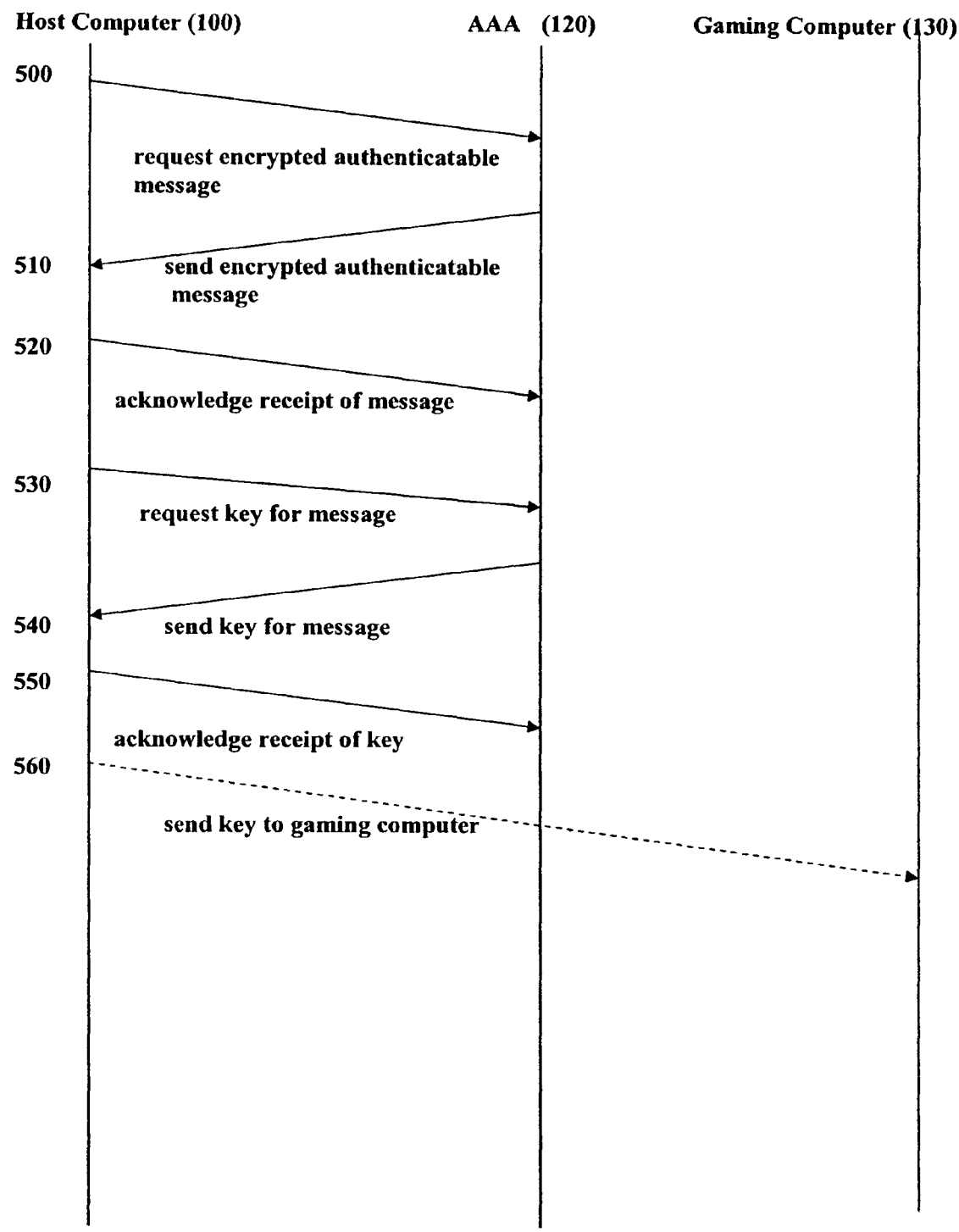
FIGURE 5. FLOW DIAGRAM BETWEEN HOST COMPUTER, AAA AND GAMING COMPUTER

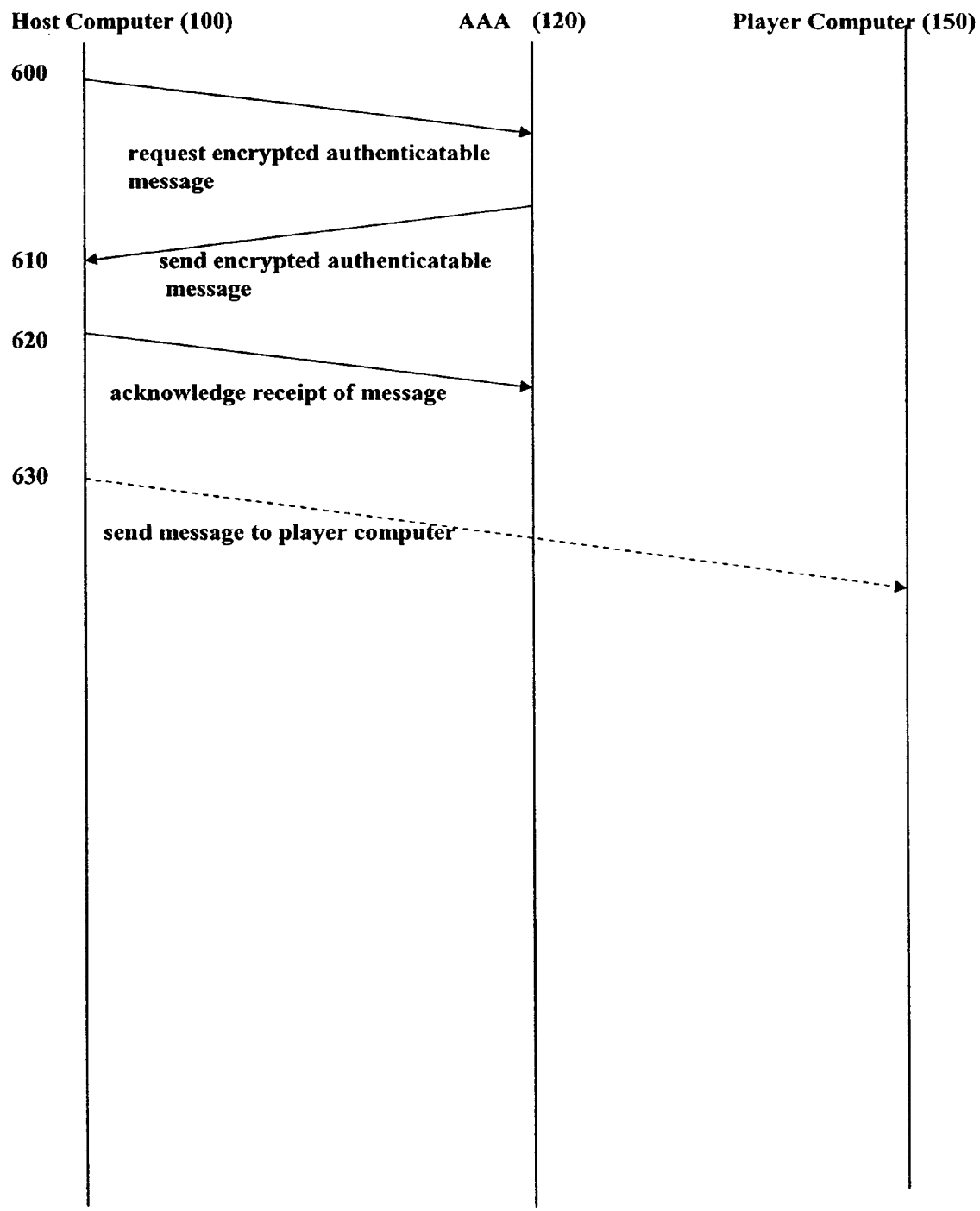
FIGURE 6. FLOW DIAGRAM BETWEEN HOST COMPUTER, AAA AND PLAYER COMPUTER

SYSTEM AND METHOD OF NETWORKED WAGERING

TECHNICAL FIELD

The present invention relates generally to an Interstate or Internet gaming system, and more particularly, to a system and method to permit interstate or foreign wagering from remote locations where the player is enabled to establish, join and/or maintain a business entity bestowing an intra-forum presence to the foreign or interstate player.

BACKGROUND OF THE INVENTION

Internet gambling is a growing industry. As a result of advances in computer technology and telecommunications, Internet gaming systems have been devised in which a player can participate in a plurality of games of chance being offered by a gambling establishment without being physically located on the premises. The Internet offers easy and inexpensive access to a variety of gambling services, bringing competition to an industry that has long operated under highly restrictive licensing practices. Thanks to the Internet, players no longer have to fly to Las Vegas to play the slots, drive to the nearest authorized track to play the horses, or even walk to the corner store to play the lottery. Players can now play those or other games at home via the many Internet sites that offer gambling products or services. Since the mid-1990s, Internet gambling operators have established approximately 1,800 e-gaming Web sites in locations outside the United States, and global revenues from Internet gaming are projected to be between $8.7 Billion to $42.8 Billion over the next ten years. The legal framework for regulating Internet gaming in the United States and overseas is complex. U.S. law as it applies to Internet gaming involves both state and federal statutes. In general, gambling is regulated at the state level, with each state determining whether individuals can gamble within its borders and whether gaming businesses can legally operate there. Five states (Illinois, Louisiana, Nevada, Oregon and South Dakota) have enacted laws that specifically prohibit certain aspects of Internet gambling, but laws in other states that prohibit some types of gambling activities generally apply to Internet gaming as well. Federal law recognizes that state laws vary and seeks to ensure that neither Interstate nor foreign commerce is used to circumvent them.

As late as 2006, federal legislation found that Internet gaming presents a "growing cause of debt collection problems" for financial institutions, including depository banks and the consumer credit card industry. In addition, given that the vast majority of the Internet gaming companies are located in foreign countries—where federal, state and local regulation, oversight and taxation is impossible—a number of commentators suggested that recent legislation embodied a protectionist reaction to an industry practically immune from domestic control. As Internet gaming companies, players and a potential tax base continue to operate outside the jurisdictional reach of federal and state governments, a practical and useful solution would be to encourage the domestication of these different interests, operations and factions. Bringing the gaming companies, players and governmental authorities into one state, territory or forum will advance a number of constructive objectives. First, the gaming industry will benefit from uniform regulation and oversight. Second, the federal, state, territory or local forum will benefit from the exposure to a tax base that previously did not exist. Third, the gaming companies, governmental authorities and players will benefit from an organization or entity that will be responsible for allocating and collecting the taxes and fees associated with or placed on the gaming. Finally, players will be permitted to responsibly enjoy an activity and pastime that was recently curtailed due to a lack of proper or appropriate control mechanisms. In order to accomplish these goals and benefits, a system and method must be developed to transfigure foreign and/or interstate wagering into an intrastate, sanctioned activity.

Americans love to gamble. At least fifty-six (56%) percent of Americans gambled in 1995. Having already embraced traditional games of chance, Americans are certainly extending a warm welcome to Internet gambling, legal or not. The prior art failed to address this growing need. For example, U.S. Pat. No. 6,527,638 to Jay Walker et al. discloses a secure improved remote gaming system whereby a player can gamble against a wagering establishment or state-run lottery from a remote location on a personal computer or portable device where it is unnecessary to establish an on-line connection with a host computer associated with the wagering establishment.

While such a system provides a means by which a player can gamble from a remote location, it failed to address the taxation, debt collection and regulatory oversight issues currently associated with Internet gambling. It would, therefore, be highly desirable to provide a remote gaming system allowing a player to legally engage in gambling on a gaming computer at a remote location, at the player's convenience.

Accordingly, it is an object of the present invention to provide a method and system to transfigure foreign or interstate wagering to an intrastate sanctioned activity.

SUMMARY OF THE INVENTION

Therefore, the present invention provides a solution to the above problems, and it is an object of the present invention to provide a system and method to permit foreign and/or interstate gaming from remote, Internet or locally accessible locations where the wager is placed, accepted and settled all within a single state, territory or other forum where wagering and other games of chance are sanctioned. An organization principally situated in the forum location (the "forum host") establishes and maintains a business entity in the forum bestowing an intra-forum presence to the foreign or interstate player. Through the business entity, the forum host can account for the player's wagers, winnings and losses, while at the same time, allocating and collecting the appropriate federal, state and/or local taxes and fees on the player's account.

It is a further object of the present invention to provide for automated and centralized management of a player's interaction with a gaming establishment under the auspices of the forum host or one or more principals of the business entities.

It is yet another object of the present invention to provide for Authentication, Accounting and Authorization (AAA) of the remote player by an apparatus independent of the forum host's computer and the gaming computer.

It is a further object of the present invention to provide a robust and secure system, yet flexible enough to allow for manual input.

According to one aspect of the present invention, there is provided an automated player system adapted to allow foreign or interstate wagering from remote, Internet or locally accessible locations, comprising a host computer system, which manages betting activities of a plurality of players, enables one or more players at a local or remote location to establish, join and/or maintain a business entity bestowing an intra-forum presence to the foreign or interstate player, accounts for the player's wagers, debts, liabilities, obligations and expenses, authenticates the player, collects or apportions taxes and fees and generates an audit-trail; an off-line gaming computer remotely located from the host computer on which the forum host (on the player's behalf) wagers on at least one wagering opportunity, wherein the host computer generates at least one authenticatable message with a token to be provided to the gaming computer indicating that the player and/or forum host is deemed qualified to participate in intrastate gaming for purposes of the local forum's laws, rules or regulations and the gaming computer allows the player to participate in a gaming activity wherein upon expiration of the token, the gaming computer generates an inquiry notice to the host computer requesting a status of the player's account; and a statistical database for tracking the player's activities.

According to another aspect of the present invention, there is provided an automated player method enabling the player at a remote, Internet or locally accessible location to establish, join and/or maintain a business entity bestowing an intra-forum presence to the interstate player comprising: providing a request to the host computer indicating an intent to become one of a member, subsidiary or separate series of a business entity; agreeing to become a chosen class of membership of the business entity with certain limited voting rights (if any); receiving a certificate of membership wherein the certificate contains an identifier that identifies the member/player; requesting to purchase credit for use; proceeding to wager on at least one wagering opportunity presented on the gaming computer; accumulating wagering credits or debits on the gaming computer; redeeming gambling credits or debits from the gaming computer using the host computer as a proxy.

According to a further aspect of the present invention, there is provided an automated player method enabling the player at a remote location to establish, join and/or maintain a business entity bestowing an intra-forum presence to the foreign or interstate player, which accounts for the player's wagers, debts, liabilities, obligations and expenses and authenticates the player, wherein a host computer manages, directs or places the member/player's betting activities, comprising: requesting from an AAA server an encrypted authenticatable message; receiving said message from said server; acknowledging receipt of said message; transmitting said message to the player; requesting from said server a key used to encrypt the message; receiving said key from said server; acknowledging receipt of said key; and transmitting said key to the gaming computer.

BRIEF DESCRIPTION OF THE DRAWINGS

The above and other objects, features and other advantages of the present invention will be more clearly understood from the following detailed description taken in conjunction with the accompanying drawings, in which:

FIG. 1 is an overview of the Automated Player System according to the present invention;

FIG. 2 is a Host Computer Interface Block Diagram according to the present invention;

FIG. 3 is a configuration of a business entity (e.g., a series Limited Liability Company (LLC)), according to the present invention;

FIG. 4 is a flow diagram between host computer, player and gaming computer according to the present invention;

FIG. 5 is a flow diagram between host computer, AAA and gaming computer according to the present invention;

FIG. 6 is a flow diagram between host computer, AAA and player computer according to the present invention;

DETAILED DESCRIPTION OF THE PREFERRED EMBODIMENTS

Preferred embodiments of the present invention will be described in detail herein below, with reference to the accompanying drawings.

The present invention provides a system and method to permit foreign or interstate wagering from remote, Internet or locally accessible locations where the wager is placed, accepted and settled all within a state, territory or other forum where wagering and other gaming is sanctioned. The process is automated via a host computer system, which manages betting activities of a plurality of players, and enables one or more players at a local, remote, Internet or locally accessible location to participate in intrastate gaming for purposes of the local forum's rules, regulations and laws affecting the gaming industry.

FIG. 1 is a system overview illustrating the preferred Automated Player System and FIG. 2 is the accompanying Host Computer Interface Block Diagram. According to this illustrative example, forum host (100) enables one or more players (150, 160, 170) located at an Internet (through direct link, wireless or other communications media) accessible site (190) to establish, join and/or maintain a business entity (190) bestowing an intra-forum presence to the foreign or interstate player. The forum host computer manages betting activities of the members/players with the gaming/wagering establishment server (130) through statistical data base (125). This task is accomplished by executing the different modules (230, 240, 260) and activating the associated communication links (235, 255, 265). The forum host computer accepts payment from the member/player by mail (105), through the audio response unit (110), in person (115) or electronically from financial institution (140). To achieve this objective, the forum host computer executes the different modules (270, 280, 210, 220, 230) and activating the associated communication links (225, 235). The forum host computer accounts for the player's wagers, debts, liabilities, obligations and expenses, authenticates the player through Authentication, Accounting and Authorization (AAA) server (120) via module (250) and communication link (255). The host computer collects or apportions taxes and can remit the funds or information to government agency (180) and generates an audit-trail by executing module (220) and activating link (225). The AAA server also performs encryption/decryption of messages as requested by the host computer.

An organization situated in the forum location (the "forum host") establishes and maintains a business entity to bestow an intra-forum presence to the foreign or interstate player. Through the business entity, the forum host can account for the player's wagers, winnings and losses, while at the same time, allocating and collecting the appropriate federal, state and/or local taxes and fees on the player's account. FIG. 3 shows a configuration of a business entity (e.g., a series Limited Liability Company), according to the present invention. Forum host (300) will establish any number of umbrella corporate entities under applicable law. The business entities will be physically located in the forum. Under each umbrella business entity (310), the forum host will accept and enroll individual members/players (330) as separate and distinct sub-entities under the umbrella business entity. For instance, under the Delaware Limited Liability Company Act, a forum host can form and maintain a "series" limited liability company ("LLC"). 6 Del. C. §18-215. Under each umbrella LLC, each individual player will be a designated series. The forum host can be the manager or it can designate a manager (320) for the LLC and each individual series. The function of the manager is partly automated as herein disclosed.

The transformation of an individual player into a participating member of a business entity provides at least three material advantages. First, given that each member/player represents a separate series under the umbrella LLC, the member/player will be deemed to maintain an existence and presence within the forum state. Accordingly, the player will be deemed qualified to participate in intrastate gaming for purposes of the local forum's laws, rules, and regulations affecting the gaming industry.

Second, the forum host's status as the manager of the business entity and each individual series will enable it to allocate and collect the appropriate federal, state and/or local taxes and fees assessed against the particular activity. Moreover, the forum host (as manager for the umbrella business entity and each of the series) will provide, to the extent required, the federal, state and/or local authorities with sufficient information to provide adequate oversight and regulation of the players' (individually, or in the aggregate) activities.

Finally, the forum host's use of a limited number of umbrella LLCs, while maximizing the number of designated series under each umbrella LLC, will prove more cost effective than establishing a separate account or residency for each individual player. There is no limit to the number of series any one business entity can possess or maintain. Given the invention, the number of series per entity has to be a product of two considerations.

First, in addition to the total variable overhead cost, there has to be a sufficient number of series to make the carrying cost of maintaining the business entity a marginal cost of doing business.

Second, the number of series cannot be too large so as to threaten the accounting/allocation function of the invention. Stated succinctly, the number (e.g., initially 100-200 series (members/players) per entity) has to be large enough to make the carrying cost a normal cost of doing business (and allow the company to remain profitable) but not too large to be unmanageable. Given higher profit margins/revenue per player, or the category of member/player the number of series can be lower.

Referring to FIGS. 1, 2 and 4, a player can register in many ways. For example, the prospective member/player can (a) walk-in and personally register; (b) register by mail; (c) register by telephone or via the response unit; and/or (d) register remotely via the Internet. These different options are executed by host computer (100) via the encrypted Internet link or direct link (235), manual interface program (270) or through player interface/registration program (230).

Under the preferred embodiment, a player remotely registers to become a separate and distinct sub-entity under the umbrella business entity (e.g., a member or series of a LLC, partnership or any other entity allowed under the forum laws). FIG. 4 and FIG. 6 are flow diagrams illustrating a method of initial registration of the individual. In step 400, the individual requests to become a member, subsidiary or separate series of a business entity. The request to become a member is in the form of an application where the individual provides personal information sufficient to ascertain the identity, age and location of the individual. In step 410, the individual receives a business entity's operating agreement or bylaws (license). In step 415, the individual returns the agreement by accepting the terms of the agreement and thus becomes a series or member with certain limited rights. These rights may extend to voting on non-strategic and operational matters as set forth in the operating agreement of the entity. A certificate of membership is sent to the new member along with a unique personal identification number (PIN) allowing access to the system in step 420. The new member/player acknowledges receipt of the certificate in step 425. The new member/player can also acquire real or personal property or other rights or interests in exchange as part of his or her membership. For example, the new member/player can acquire a limited-voting share in the LLC, a 1/1,000,000 interest in a parcel of land in the forum location or a leasehold interest in the forum location. The member also obtains the right to effectuate any other business that can be transacted by the forum host in the forum location. An encrypted authenticatable message with a token is sent to the member/player in step 430 and concurrently in step 435, the key to the authenticatable message is sent to the gaming computer. In step 440, the new member/player may now request to purchase credit. When and if the new member/player requests to purchase credit, the member/player is asked to fund the account. Any form of funding is accepted, including but not limited to cash, money order, credit card, debit card, personal checks or wire transfer. For cash, money orders, personal checks or wire transfer, the process of funding the account is done manually. For credit card or debit card, the transfer is done automatically. The banking interface program, in conjunction with AAA, establishes the money transfer from the financial institution into the member/player's account in the forum. The protocol regulating the communication exchange with the financial institution is implemented using established and well known standards, which need not be described here. A statement is sent to the member/player indicating that his/her account is credited with the amount authorized. In step 445, the member/player request to play. In step 450, the host computer forwards the forum host or manager's request on behalf of the member to the gaming computer along with the credit amount and the member's forum identification. If the request is to play the lottery, for example, banner ads may be directed at the member/player while the transaction takes place. If the member/player requests to play a different game requiring interaction with the gaming computer, the member/player is now directed to the statistical data base server, which enables the member or forum host to engage the gaming computer. The switch-over is seamless. In this case, the statistical data base server acts as a proxy of the forum host or manager.

The statistical data base server compiles and maintains the statistics on the member/player. For example, name, age, gender, address, email address, telephone number, annual household income, financial institution information (banks, credit card company, etc.), player's payment/distribution instructions, how often the player bets, how much the player bets, when the player bets (days, time of days, ratio of bets to household income) are some of the data gathered by the statistical data base. The gaming computer determines when the token expires and sends an inquiry notice to the host computer requesting the status of the member/player. Based on the member/player's account balance, the host computer could query the member/player to find out if the member/player wishes to continue playing or purchase more credit. An indication is sent to the gaming computer based on the outcome of the communication with the member/player. If the member/player decides to continue playing, the host computer determines if there is sufficient credit in the account. If the account balance is below a certain threshold, the member/player is asked to fund the account as explained above. If there is sufficient credit in the account or after the account is funded, the process resumes at step 450. If the member/player decides to quit playing, the gaming computer is so informed. At the end of the game, the gaming computer returns the token, which indicates how much the member has spent, wagered and/or won. The token is forwarded to the AAA server, which adjusts the member/player's account. The host computer instructs the AAA server to collect or apportions taxes on earnings if any and also collects applicable usage fee. The different fees and taxes or information regarding same are then forwarded to the respective governing agencies. A detailed periodic report using the audit trail is generated and forwarded to the member/player.

Prior to sending the encrypted authenticatable message to the member in step 430, the host computer requests the message from the AAA server as shown in FIG. 6, step 600. In step 610, the AAA server in response to the request sends the message to the host computer. In step 620, the host computer acknowledges receipt of the message and forwards the message to the member/player computer as shown in step 630. Step 630 represents the same action taken in step 430 hence, it is shown in dashed lines.

In another embodiment, authentication, accounting and authorization of the member/player is provided by an apparatus independent of the host computer and the gaming computer. Prior to sending the encrypted authenticatable message in step 430, the host computer interacts with the AAA server as illustrated in FIG. 5. In step 500, host computer (100) requests an encrypted authenticatable message from the AAA server. In step 510, the message is sent to the host computer by the AAA server. In step 520, the host computer acknowledges receipt of the message. The host computer sends the message to the member/player computer as shown in FIG. 6. In step 530, the host computer requests the encryption key for the message from the AAA server. In step 540, the key is sent to the host computer. In step 550, the host computer acknowledges receipt of the key. In step 560, the host computer sends the key to the gaming computer.

In yet another embodiment, the individual registers in person, by mail, via the audio response unit (telephone), or via fax. Referring to FIG. 2, manual interface program (270) and fax interface program (280) are utilized to execute a manual operation. The individual is asked to complete an application and provide identification to ascertain the identity, age and permanent location of the individual. The operator is guided through the process by the host computer similar to the remote process.

Although the preferred embodiments of the present invention have been disclosed for illustrative purposes, an artisan of ordinary skill in the art will readily understand that various modifications, additions and substitutions are possible, without departing from the scope and spirit of the invention as further defined by the accompanying claims.

I claim:

1. An automated player method enabling a player to establish, join, or maintain a business entity, in accordance with applicable legal authority, bestowing an intra-forum presence to the player comprising the steps of:

(a) receiving by a host computer associated with a selected forum a request from a user to become a legally recognized member of a business entity organized in a selected forum;

(b) authenticating through the use of the host computer the user as a legally recognized member of the business entity;

(c) reporting by the host computer an authentication status of the user to a government authority, thereby enabling the user residing in any forum to wager via an Internet gaming system comprising a gaming computer, the host computer associated with the selected forum and a player computer located in any forum under the laws and regulations of the selected forum; and (d) receiving a wager on at least one wagering opportunity presented to the user via the gaming computer.

2. The method of claim 1, wherein step (a) further comprises providing required personal information to the host computer.

3. The method of claim 1, wherein step (b) further comprises receiving by the host computer an acknowledgement from the player computer.

4. The method of claim 1, further comprising receiving from the host computer at least one authenticatable message with a token to be provided to the gaming computer.

5. The method of claim 1, wherein step (c) further comprising said host computer compiling wagering results and withholding usage fees for a gaming agency and taxes on earnings.

6. The method of claim 1, further comprising the host computer directing banner ads to the player computer.

7. The method of claim 4, wherein the authenticatable messages are encrypted with an encryption key transmitted by the gaming computer.

8. The method of claim 5, further comprising crediting a member's account with accumulated wagering credits from the gaming computer.

9. An automated player system comprising:

a memory for storing information relating to a business entity organized in accordance with applicable legal authority in a selected forum;

a processor in communication with the memory, the processor configured to:

(a) receive a request from a user to become a legally recognized member of the business entity organized in the selected forum;

(b) authenticate, using the information relating to a business entity, the user as a legally recognized member of the business entity;

(c) report an authentication status of the user to a government authority, thereby enabling the user residing in any forum to wager via an Internet gaming system associated with the selected forum; and (d) receive a wager on at least one wagering opportunity presented to the user via the Internet gaming system.

* * * * *